United States Patent
Kitazawa et al.

(10) Patent No.: US 12,263,667 B2
(45) Date of Patent: Apr. 1, 2025

(54) COMPOSITE MATERIAL AND METHOD OF FORMING COMPOSITE MATERIAL

(71) Applicant: MITSUBISHI HEAVY INDUSTRIES, LTD., Tokyo (JP)

(72) Inventors: Toshiki Kitazawa, Tokyo (JP); Shoya Mano, Tokyo (JP); Hiromichi Akiyama, Tokyo (JP); Kenji Murakami, Tokyo (JP); Masahiko Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 761 days.

(21) Appl. No.: 17/293,331

(22) PCT Filed: Dec. 17, 2019

(86) PCT No.: PCT/JP2019/049275
§ 371 (c)(1),
(2) Date: May 12, 2021

(87) PCT Pub. No.: WO2020/137671
PCT Pub. Date: Jul. 2, 2020

(65) Prior Publication Data
US 2021/0402674 A1     Dec. 30, 2021

(30) Foreign Application Priority Data
Dec. 27, 2018     (JP) .................................. 2018-245054

(51) Int. Cl.
*B29C 70/68*     (2006.01)
*B29C 53/00*     (2006.01)
(Continued)

(52) U.S. Cl.
CPC .............. *B32B 7/12* (2013.01); *B29C 53/005* (2013.01); *B29C 53/04* (2013.01); *B29C 70/54* (2013.01);
(Continued)

(58) Field of Classification Search
CPC ..... B29C 70/682; B29C 70/54; B29C 70/021; B29C 53/02; B29C 53/04; B32B 3/02;
(Continued)

(56) References Cited

U.S. PATENT DOCUMENTS 4,744,846 A * 5/1988 Pflug ....................... B32B 29/00
264/516
4,756,863 A * 7/1988 Petershofer ........... B31F 1/0009
425/374
(Continued)

FOREIGN PATENT DOCUMENTS

JP     3-295631     12/1991
JP     5-185539     7/1993
(Continued)

OTHER PUBLICATIONS

International Search Report issued Mar. 17, 2020 in International (PCT) Application No. PCT/JP2019/049275, with English-language translation.
(Continued)

*Primary Examiner* — Galen H Hauth
*Assistant Examiner* — Baileigh Kate Darnell
(74) *Attorney, Agent, or Firm* — Wenderoth, Lind & Ponack, L.L.P.

(57) ABSTRACT

A composite material includes a laminate in which fiber sheets are laminated. The laminate has a bendable portion that is to be bent along a mold. In a region of the laminate
(Continued)

from an end edge on a bent side to the bendable portion, the laminate is divided into layers along a plate thickness direction of the laminate.

8 Claims, 6 Drawing Sheets

(51) Int. Cl.
  *B29C 53/04* (2006.01)
  *B29C 70/54* (2006.01)
  *B32B 5/02* (2006.01)
  *B32B 7/12* (2006.01)
  *B29K 105/00* (2006.01)
  *C08J 5/24* (2006.01)

(52) U.S. Cl.
  CPC .... *B29C 70/682* (2013.01); *B29K 2105/0005* (2013.01); *B29K 2105/256* (2013.01); *C08J 5/24* (2013.01)

(58) Field of Classification Search
  CPC .. B32B 5/022; B32B 5/26; B32B 5/02; B32B 5/28; B32B 7/12; B32B 7/06; B32B 15/14; B32B 2250/20; B32B 2260/023; B32B 2260/046; B32B 2307/748
  See application file for complete search history.

(56) References Cited

U.S. PATENT DOCUMENTS

| | | | |
|---|---|---|---|
| 4,995,933 A * | 2/1991 | Brussel | B26D 7/0675 156/247 |
| 5,348,602 A * | 9/1994 | Makarenko | B29C 70/56 156/286 |
| 5,418,035 A | 5/1995 | Iguchi et al. | |
| 5,464,493 A * | 11/1995 | Iguchi | B29C 66/474 156/290 |
| 2010/0284810 A1 * | 11/2010 | Corman | B29C 70/20 264/44 |
| 2011/0121487 A1 | 5/2011 | Topping et al. | |
| 2012/0312459 A1 * | 12/2012 | De Mattia | B29C 70/30 156/481 |
| 2013/0118770 A1 | 5/2013 | De Jong et al. | |
| 2014/0302276 A1 | 10/2014 | Kusu et al. | |
| 2015/0190974 A1 | 7/2015 | Topping et al. | |
| 2016/0207266 A1 | 7/2016 | Koncz | |
| 2017/0252982 A1 | 9/2017 | Knutson | |
| 2019/0277141 A1 * | 9/2019 | Gill | B29C 53/382 |
| 2021/0402751 A1 * | 12/2021 | Theofanous | B29C 70/46 |

FOREIGN PATENT DOCUMENTS

| JP | 11-216740 | 8/1999 |
|---|---|---|
| JP | 2011-529405 | 12/2011 |
| JP | 2014-15014 | 1/2014 |

OTHER PUBLICATIONS

Written Opinion of the International Searching Authority issued Mar. 17, 2020 in International (PCT) Application No. PCT/JP2019/049275, with English-language translation.

Extended European Search Report issued Dec. 14, 2021 in corresponding European Patent Application No. 19901611.4.

* cited by examiner

COMPOSITE MATERIAL AND METHOD OF FORMING COMPOSITE MATERIAL

TECHNICAL FIELD

The present disclosure relates to a composite material and a method of forming a composite material.

BACKGROUND ART

In the related art, as a method of manufacturing a composite material having irregularities or a contour, a method of obtaining a composite material having a desired shape by laminating prepregs into a planar shape or a gently curved surface shape, and then forming the composite material by a press, a drape, or the like has been reported (PTL 1). This method has the advantage that a reduction in capital investment or speeding-up of lamination becomes possible as compared with a method of directly laminating narrow tapes into a desired shape, as reported in PTL 2.

Further, as other methods, for example, PTL 3 and PTL 4 have been reported. PTL 3 discloses a method in which a plurality of laminates are fabricated and the laminates are then sequentially laminated and press-formed. According to this method, it becomes possible to suppress a plate thickness to be formed at one time to a certain level or less. Further, PTL 4 discloses a method in which a sheet fixed to a jig is sandwiched between the respective layers of a plurality of layers of a laminate and drape forming is performed while pulling out the sheets at one time. According to this method, it is considered that since appropriate tension can be applied to each layer of the laminate, it becomes possible to prevent the occurrence of wrinkles during forming, or the like.

CITATION LIST

Patent Literature

[PTL 1] United States Patent Application Publication No. 2017/0252982
[PTL 2] United States Patent Application Publication No. 2013/0118770
[PTL 3] Japanese Unexamined Patent Application Publication No. 2014-15014
[PTL 4] United States Patent Application Publication No. 2016/0207266

SUMMARY OF INVENTION

Technical Problem

On the other hand, in the method disclosed in PTL 1, when the plate thickness of the laminate is increased, there is a possibility that a problem may occur in which due to an increase in interlayer friction during the forming, or the like, wrinkles are generated in the composite material or a desired shape is not obtained.

Further, in the method in which a plurality of laminates each having a relatively small plate thickness are fabricated and then sequentially formed, as in PTL 3, since a process including "lamination, transfer to a forming tool, and forming" has to be repeated for each laminate, there is a problem in which it takes time to manufacture a component (that is, the number of steps increases). Further, since it is necessary to sequentially dispose the separately fabricated laminates at the forming tool, there is also a problem in which alignment at that time is difficult.

Further, in the method of performing forming while pulling out the sheet, as in PTL 4, since it is necessary to pull out the sheet while applying pressure required for forming, in particular, in a case where a forming site (area) in the laminate is large, the friction between the sheet and the laminate increases. In this case, there is a possibility that a problem may occur in which it becomes difficult to pull out the sheet from the laminate at the time of the forming (that is, it becomes difficult to form the composite material).

The present disclosure has been made in view of such circumstances, and has an object to provide a composite material and a method of forming a composite material, in which in a case of bending and forming a composite material, it is possible to prevent the occurrence of problems such as the occurrence of wrinkles in the composite material, an increase in the number of steps for forming, and forming of the composite material becoming difficult.

Solution to Problem

In order to solve the above problems, the present disclosure adopts the following means.

According to an aspect of the present disclosure, there is provided a composite material including: a laminate in which a plurality of fiber sheets are laminated, in which the laminate has a to-be-bent portion that is to be bent along a die, and in a region of the laminate from an end edge on a bending side to the to-be-bent portion, the laminate is separated into a plurality of layers along a plate thickness direction of the laminate.

In the composite material of the present disclosure, in the region that is bent at the time of forming (the region from the end edge on the bending side to the to-be-bent portion), the laminated fiber sheet (the laminate) including a plurality of fiber sheets is separated into a plurality of layers along the plate thickness direction of the laminate. Therefore, the composite material can be formed by sequentially bending the composite material separated into a plurality of layers layer by layer. In this way, it is possible to prevent the occurrence of a problem such as the occurrence of wrinkles or the inability to obtain a desired shape, which has occurred when a thick laminate is bent and formed at one time. Further, it is also possible to prevent the occurrence of a problem such as an increase in the number of steps or labor for alignment, which has occurred when a plurality of thin laminates are prepared and sequentially formed. Further, it is also possible to prevent the occurrence of a problem in which the pulling-out of the sheet becomes difficult (the forming of the composite material becomes difficult) due to an increase in a frictional force that is generated between the sheet and the laminate, which has occurred when each sheet is sandwiched between a plurality of layers of the laminate and bending forming is performed while pulling out the sheets at one time.

In the composite material, it is preferable that in a region on a side opposite to the end edge on the bending side with respect to the to-be-bent portion, the laminate is integrated along the plate thickness direction of the laminate.

As described above, the laminate is integrated along the plate thickness direction of the laminate in the region on the side where it is not bent at the time of forming, so that the laminate in the region on the side opposite to the separated end edge side with respect to the to-be-bent portion can be sufficiently fixed without being separated. Since the region on the side opposite to the separated end edge side with respect to the to-be-bent portion is fixed, it is possible to further save labor for alignment of the composite material at the time of forming the composite material.

In the composite material, it is preferable that a release material is provided between the respective layers of the laminate separated into the plurality of layers.

Since the laminate can be separated into a plurality of layers only by providing the release material such as a non-woven fabric, a metal, or a release film between the respective layers of the laminate separated into a plurality of layers, the composite material of the present disclosure can be easily prepared. Further, the composite material can be bent and formed by using the release material as a bending tool, or the composite material can also be bent and formed by separately using a bending tool that clamps the end portion of the laminate, such as a clip, after pulling-out of the release material. Further, by using, as the release material, a release material made of a material (various non-woven fabrics or thermoplastic film adhesives) that can be cured together with the composite material, it is possible to obtain a final product by curing the release material together with the composite material. In this way, the operation of pulling out the release material from the composite material becomes unnecessary, and thus a man-hour can be reduced.

According to another aspect of the present disclosure, there is provided a method of forming a composite material including: a preparation step of preparing a composite material which includes a laminate in which a plurality of fiber sheets are laminated, in which the laminate has a to-be-bent portion that is to be bent along a die, and in a region of the laminate from an end edge on a bending side to the to-be-bent portion, the laminate is separated into a plurality of layers along a plate thickness direction of the laminate; and a forming step of forming the composite material by bending the composite material separated into the plurality of layers layer by layer along the to-be-bent portion.

In the method of forming a composite material of the present disclosure, in the preparation step, as the composite material, the composite material is prepared in which the laminate in which the plurality of fiber sheets are laminated is separated into a plurality of layers along the plate thickness direction of the laminate in the region that is bent at the time of the forming. Therefore, in the forming step, the composite material can be formed by sequentially bending the composite material separated into a plurality of layers layer by layer. In this way, it is possible to prevent the occurrence of a problem such as the occurrence of wrinkles or the inability to obtain a desired shape, which has occurred when a thick laminate is bent and formed at one time. Further, it is also possible to prevent the occurrence of a problem such as an increase in the number of steps or labor for alignment, which has occurred when a plurality of thin laminates are prepared and sequentially formed. Further, it is also possible to prevent the occurrence of a problem in which the pulling-out of the sheet becomes difficult (the forming of the composite material becomes difficult) due to an increase in a frictional force that is generated between the sheet and the laminate, which has occurred when each sheet is sandwiched between a plurality of layers of the laminate and bending forming is performed while pulling out the sheets at one time.

It is preferable that in the preparation step, as the composite material, a composite material in which the laminate is integrated along the plate thickness direction of the laminate in a region on a side opposite to the end edge on the bending side with respect to the to-be-bent portion is prepared.

In the preparation step, the composite material in which the laminate is integrated along the plate thickness direction of the laminate in the region on the side where it is not bent at the time of the forming is prepared, so that the laminate in the region on the side opposite to the separated end edge side with respect to the to-be-bent portion can be sufficiently fixed without being separated. Since the region on the side opposite to the separated end edge side with respect to the to-be-bent portion is fixed, it is possible to further save labor for alignment of the composite material at the time of the forming step.

It is preferable that in the preparation step, as the composite material, a composite material in which a release material is provided between the respective layers of the laminate separated into the plurality of layers is prepared.

Since the laminate can be separated into a plurality of layers only by providing the release material such as a non-woven fabric, a metal, or a release film between the respective layers of the laminate separated into a plurality of layers, the composite material can be easily prepared in the preparation step.

It is preferable that in the forming step, the composite material is bent through the release material.

As described above, in the method of forming a composite material of the present disclosure, in the forming step, the composite material can be bent and formed by using the release material as a bending tool. In this way, it is not necessary to separately prepare a bending tool that clamps the end portion of the laminate, such as the clip, in the forming step.

It is preferable that after the forming step, a curing step of curing the formed composite material and the release material is performed.

By using, as the release material, a release material made of a material (various non-woven fabrics or thermoplastic film adhesives) that can be cured together with the composite material, it is possible to obtain a final product by curing the release material together with the composite material. In this way, the operation of pulling out the release material from the composite material becomes unnecessary, and thus a man-hour can be reduced.

It is preferable that the method of forming a composite material further includes a pulling-out step of pulling out the release material from the composite material, after the preparation step, and in the forming step, the composite material is bent using a bending tool.

As described above, in the method of forming a composite material of the present disclosure, after the pulling-out step of pulling out the release material is performed, in the forming step, the composite material can be bent and formed by separately using a bending tool that clamps the end portion of the laminate, such as the clip. The pulling-out step of pulling out the release material is performed, so that at the time of the bending forming in the forming step, it is possible to prevent the release material from interfering with the bending forming.

Advantageous Effects of Invention

According to the composite material and the method of forming a composite material of the present disclosure, in a case where the composite material is bent and formed, it is possible to prevent the occurrence of problems such as the occurrence of wrinkles in the composite material, an increase in the number of steps for forming, and forming of the composite material becoming difficult.

BRIEF DESCRIPTION OF DRAWINGS

FIG. 1 is a schematic diagram for explaining an example of a composite material and a method of forming a composite material according to an embodiment of the present disclosure, in which

FIG. 3 is a schematic diagram for explaining an example in a case where the composite material according to an embodiment of the present disclosure is bent into a Z-shape, in which

FIG. 4 is a schematic diagram for explaining an example in a case where the composite material according to an embodiment of the present disclosure is bent into a hat shape, in which

FIG. 5 is a schematic diagram for explaining an example in a case where the composite material is bent through the release material, in which

FIG. 6 is a schematic diagram for explaining an example in a case where the composite material is bent using a bending tool, in which

DESCRIPTION OF EMBODIMENTS

Hereinafter, an embodiment of the composite material and the method of forming a composite material according to the present disclosure will be described with reference to the drawings.

[Composite Material]

Hereinafter, the composite material and the method of forming a composite material according to an embodiment of the present disclosure will be described using FIGS. 1 to 4.

First, the composite material according to this embodiment will be described.

Figure 1A:
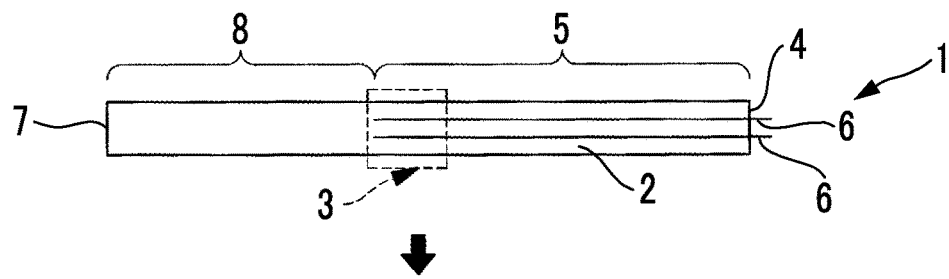
FIG. 1A is a diagram showing a state where the composite material is prepared.

FIG. 1A is a diagram showing a state where the composite material according to this embodiment is prepared.

As shown in FIG. 1A, a composite material 1 according to this embodiment includes a laminate 2 in which a plurality of fiber sheets are laminated. The laminate 2 has a to-be-bent portion 3 that is to be bent along a die (not shown). The fiber sheet may be a dry fiber sheet capable of being shaped, or may be a resin-impregnated prepreg (a resin composite material).

In a region (a first region) 5 of the laminate 2 from an end edge 4 on the bending side to the to-be-bent portion 3, the laminate 2 is separated into a plurality of layers along a plate thickness direction of the laminate 2. A release material (release film) 6 is provided between the respective layers of the laminate 2 separated into a plurality of layers in the first region 5.

On the other hand, in a region (a second region) 8 on the side opposite to the end edge 4 on the bending side with respect to the to-be-bent portion 3 in the laminate 2 (the end edge 7 side opposite to the end edge 4 in FIG. 1A), the laminate 2 is integrated along the plate thickness direction of the laminate 2.

With respect to the number of separated layers of the laminate 2 in the first region 5, a case where it is three layers is shown as an example in FIG. 1A. However, as long as it is a plurality, there is no particular limitation. For example, in a case where the laminate 2 in which 100 fiber sheets are laminated is used, an aspect can be adopted in which the laminate 2 in the first region 5 is separated into four layers each having 25 sheets.

As the material of the release material 6, in addition to the release film described above, a metal such as a thin iron plate, a non-woven fabric, or the like can be given as an example. In particular, in a case where the release material 6 is cured together with the composite material 1 to obtain a final product, as the release material 6, various non-woven fabrics, thermoplastic film adhesives (softened by heating at about 150° C.), or the like can be suitably used.

In this embodiment, an example in which the laminate 2 is integrated along the plate thickness direction of the laminate 2 in the entire region of the second region 8 of the composite material 1 will be described as an example. However, there is no limitation thereto. That is, an aspect may be adopted in which the laminate 2 is integrated along the plate thickness direction of the laminate 2 only in a part of the second region 8 of the composite material 1.

[Method of Forming Composite Material]

Next, the method of forming a composite material according to this embodiment will be described.

Hereinafter, a case where the composite material 1 is formed (bending-formed) using the composite material 1 shown in FIG. 1A will be described as an example. However, there is no limitation thereto.

(Preparation Step)

In a preparation step, the composite material 1 shown in FIG. 1A is prepared. In the preparation of the composite material 1, the fiber sheets are pressure-bonded while being laminated, and the layers of the laminate 2 which are not separated in the first region 5 and the layers of the laminate 2 in the second region 8 are bonded and integrated.

(Pulling-Out Step)

Figure 1B:
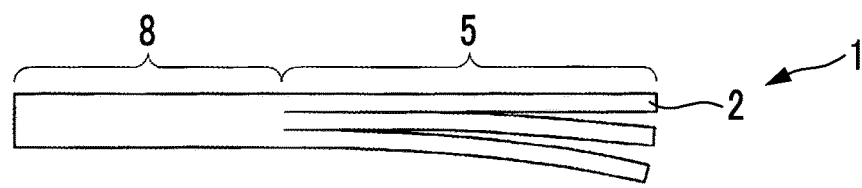
FIG. 1B is a diagram showing a state where a release material is pulled out from the composite material of FIG. 1A, and FIGS. 1C to 1E are diagrams showing a state where the composite material is sequentially bent layer by layer.

In a pulling-out step, all the release materials 6 provided between the respective layers of the laminate 2 are pulled out from the composite material 1. In this way, the composite material 1 from which the release materials 6 are pulled out, as shown in FIG. 1B, is obtained.

(Forming Step)

Figure 1C:
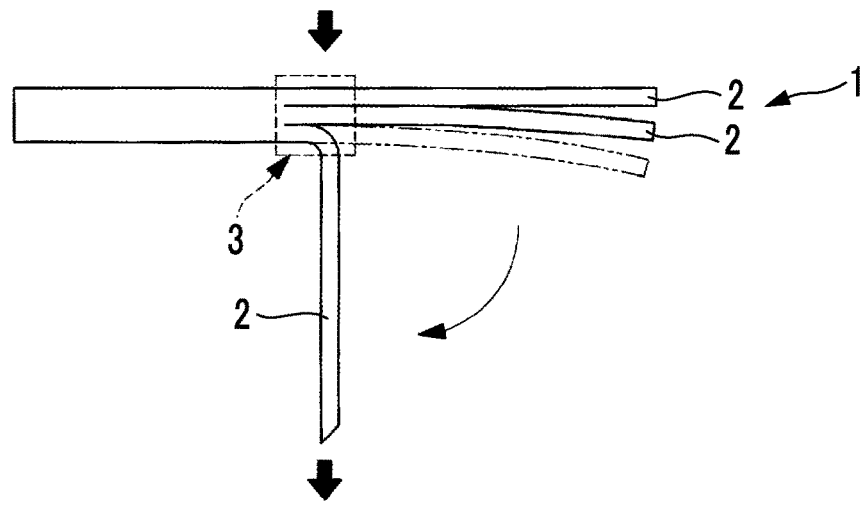
Figure 1D:
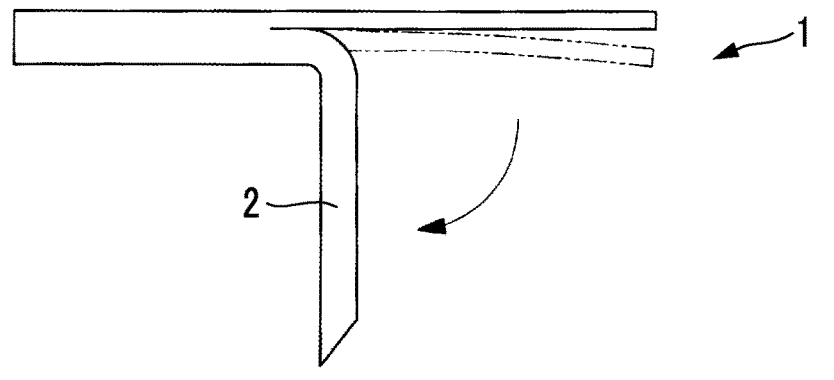
Figure 1E:
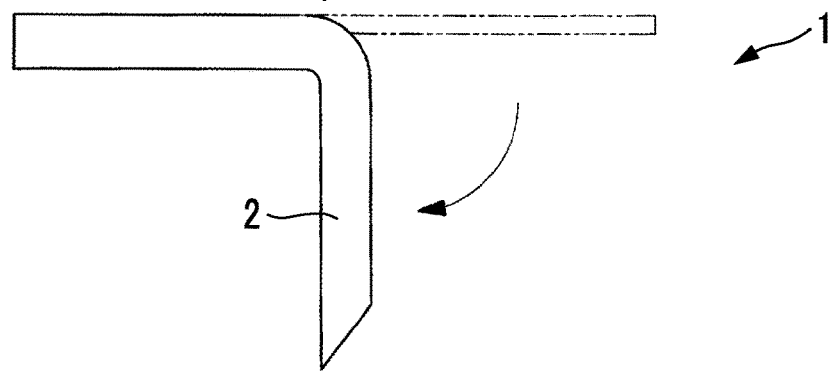

In a forming step, the composite material 1 is formed by bending the laminates 2 separated into a plurality of layers layer by layer along the to-be-bent portion 3 in order from the laminate 2 on the next bending direction (clockwise direction in the drawing) side (FIGS. 1C to 1E). In the forming of the composite material 1, the composite material 1 is disposed at a die (not shown), and bending forming is performed by a hydraulic press or evacuation. In FIGS. 1C to 1E, a case where the composite material 1 is bent into an L-shape is shown as an example.

(Resin Impregnation Step)

In a case where a dry fiber sheet is used as the fiber sheet, after the forming of the composite material 1 ends, the composite material 1 is impregnated with resin.

(Curing Step)

Figure 2:
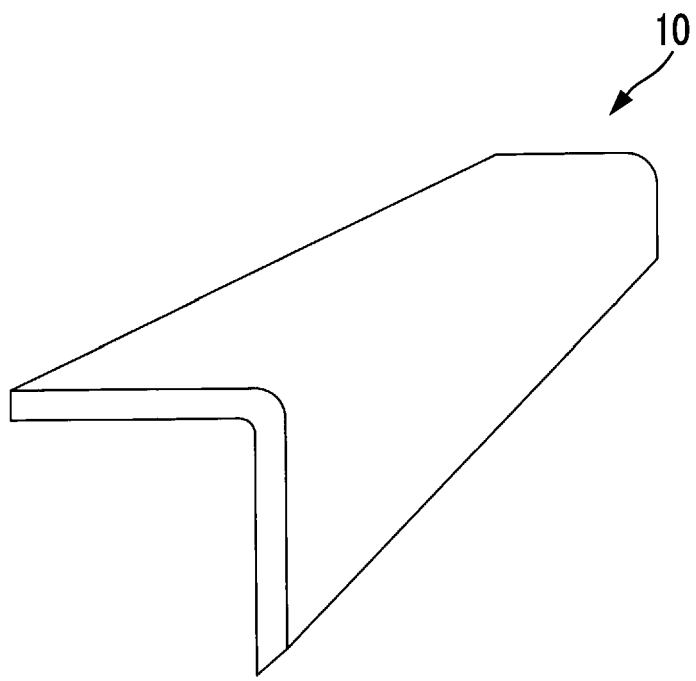
FIG. 2 is a perspective view showing a state where the composite material shown in FIG. 1E is cured.
Figure 3A:
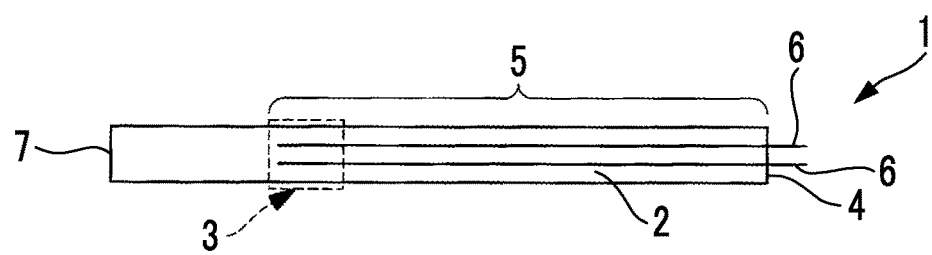
FIG. 3A is a diagram showing a state where the composite material is prepared.
Figure 3B:
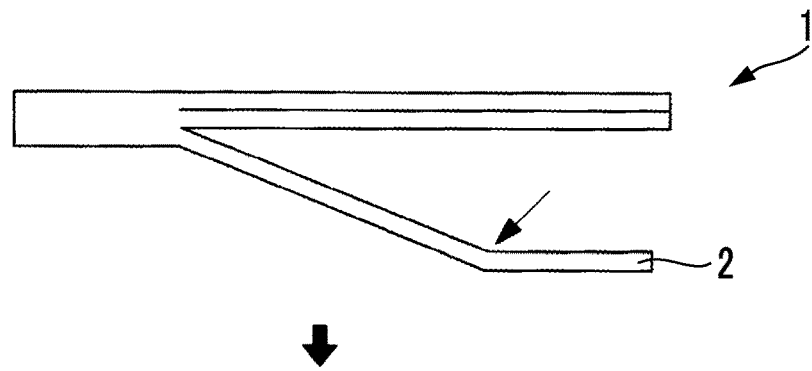
FIGS. 3B and 3C are diagrams showing a state where the release material is pulled out from the composite material of FIG. 3A and a laminate is bent into a Z-shape.
Figure 3C:
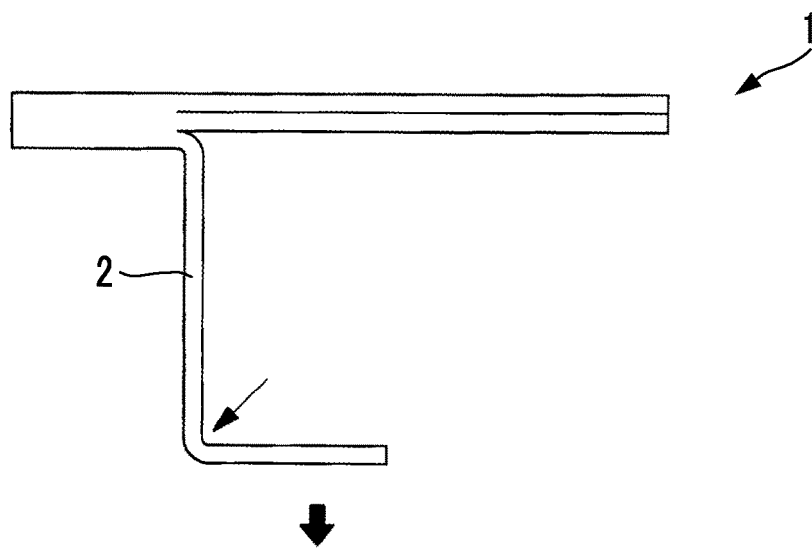
Figure 3D:
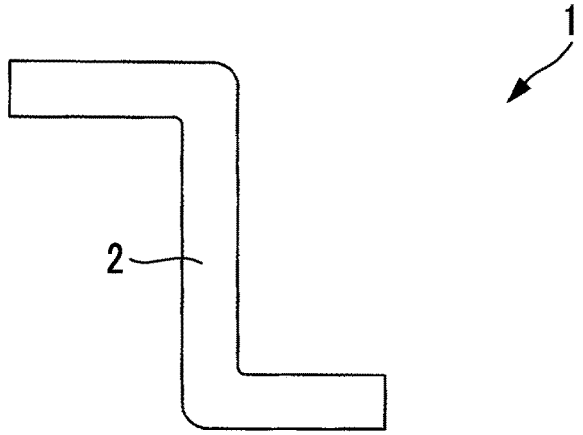
FIG. 3D is a diagram showing a state where the Z-shape bending of the composite material is completed.
Figure 4A:
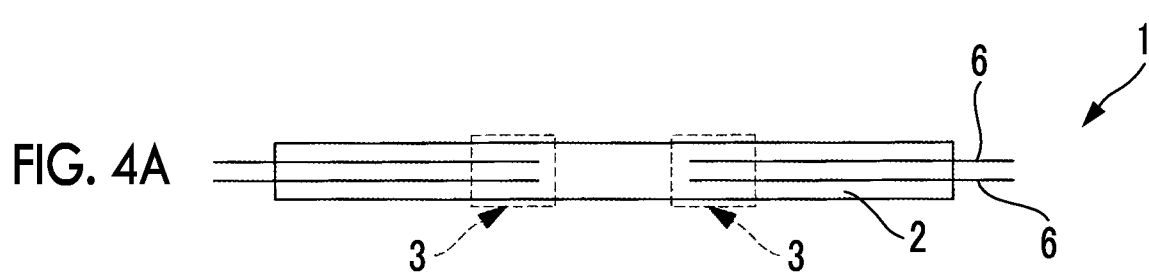
FIG. 4A is a diagram showing a state where the composite material is prepared.
Figure 4B:
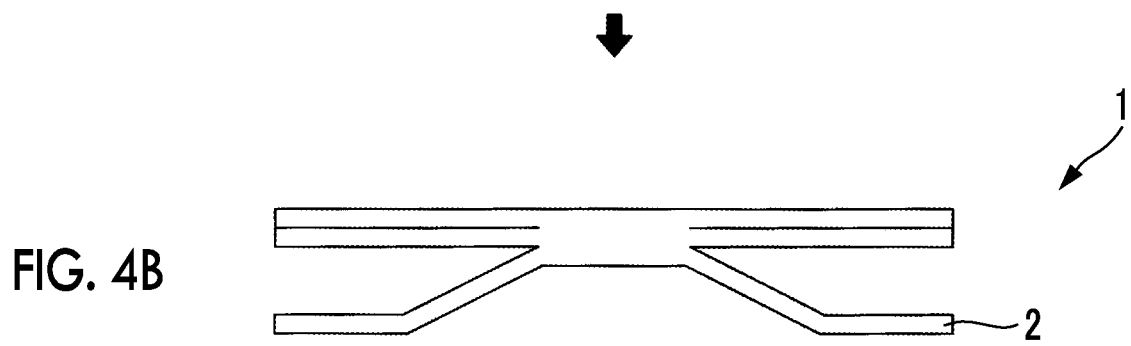
FIGS. 4B and 4C are diagrams showing a state where the release material is pulled out from the composite material of FIG. 4A and a laminate is bent into a hat shape.
Figure 4C:
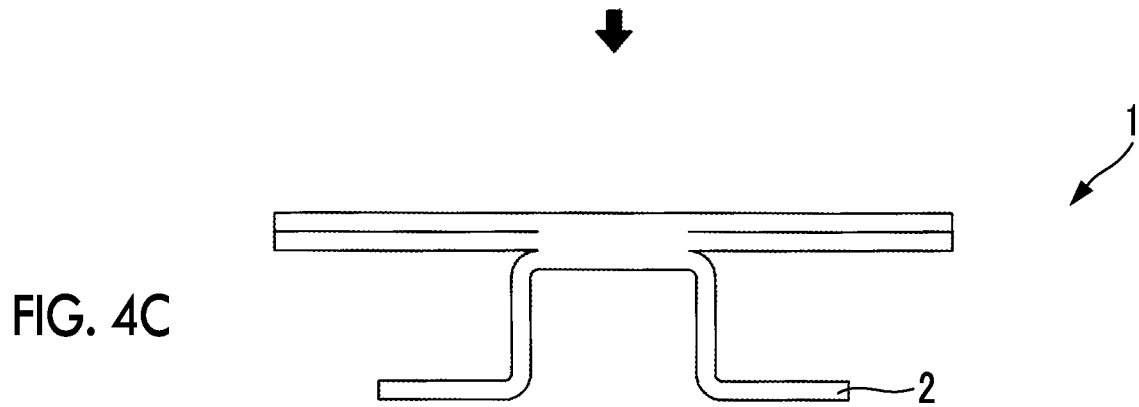
Figure 4D:
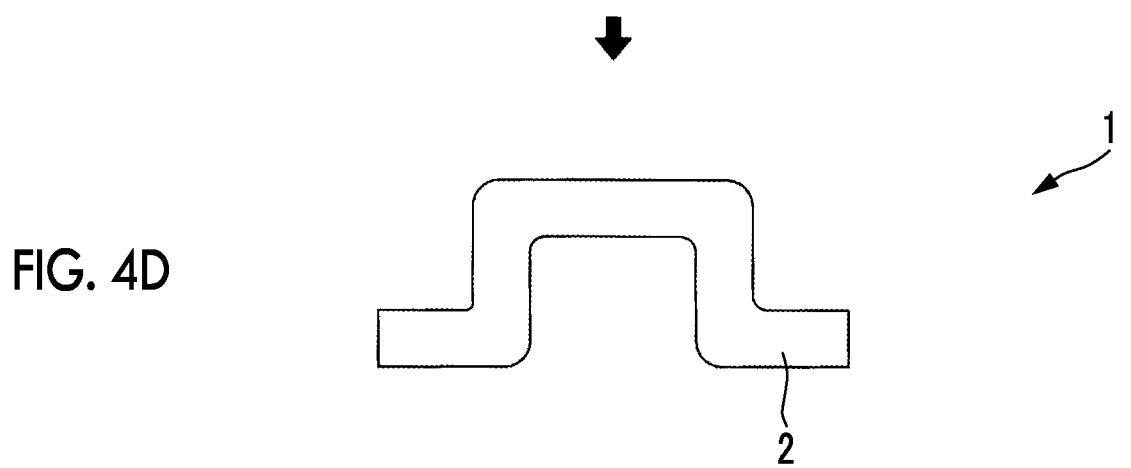
FIG. 4D is a diagram showing a state where the hat-shape bending of the composite material is completed.

In a case where a dry fiber sheet is used as the fiber sheet, after the resin impregnation step ends, curing of the composite material 1 is performed (curing step). In a case where a prepreg is used as the fiber sheet, after the forming step, curing of the composite material 1 is performed without performing the resin impregnation step. The composite material 1 shown in FIG. 1E is cured, whereby a cured composite material 10 bent into an L-shape, shown in FIG. 2, is obtained as a final product.

In this embodiment, the case where the composite material 1 is bent into an L-shape in the forming step has been described as an example. However, the bending method is not limited to this. For example, as shown in FIG. 3, an aspect in which a portion in the middle of the first region 5 in the laminate 2 (a portion different from the to-be-bent portion 3) is bent and formed in the direction opposite to the L-shape bending direction (a Z-shape bending aspect) may be adopted. As shown in FIG. 4, an aspect in which two to-be-bent portions 3 are provided in the laminate 2 and the composite material 1 is bent along the two to-be-bent portions 3 to be formed into a hat shape may be adopted.

In this embodiment, the case where the pulling-out step is performed to pull out the release material 6 from the composite material 1 and the forming step is then performed has been described as an example. However, the forming step may be performed without performing the pulling-out step.

Figure 5A:
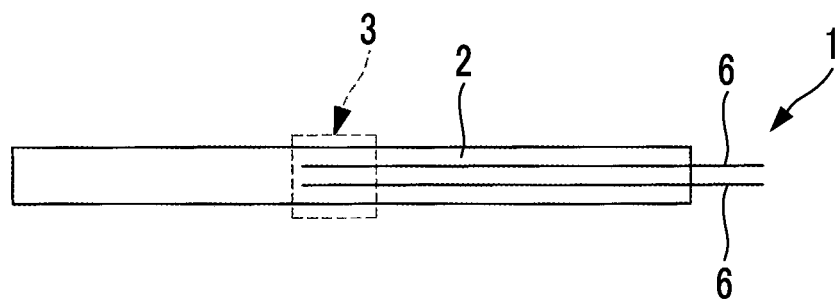
FIG. 5A is a diagram showing a state where the composite material is prepared.
Figure 5B:
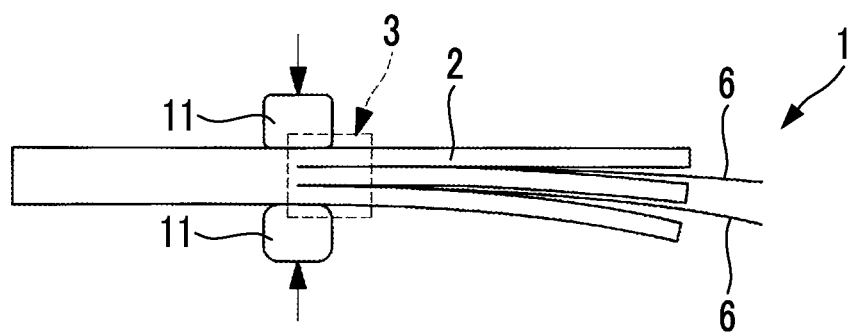
FIG. 5B is a diagram showing a state where the composite material of FIG. 5A and an end portion of the release material are pressurized and fixed.
Figure 5C:
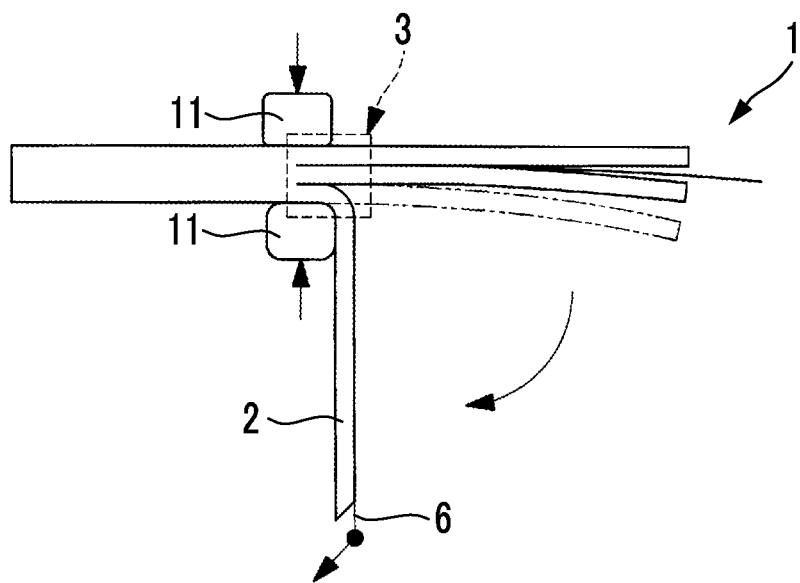
FIG. 5C is a diagram showing a state where the composite material is bent.

The case where the forming step is performed without performing the pulling-out step will be described below with reference to FIGS. 5A to 5C. FIGS. 5A to 5C are schematic diagrams for explaining an example in a case where the composite material is bent through the release material. FIG. 5A is a diagram showing a state where the composite material is prepared, FIG. 5B is a diagram showing a state where the composite material of FIG. 5A and an end portion of the release material are pressurized and fixed, and FIG. 5C is a diagram showing a state where the composite material is bent.

In the case where the forming step is performed without performing the pulling-out step, first, the composite material 1 (the same as that in FIG. 1A) shown in FIG. 5A is prepared.

Next, as shown in FIG. 5B, the to-be-bent portion 3 of the laminate 2 is pressurized by a pair of clamping members 11 and an end portion (an end portion on the to-be-bent portion 3 side) of the release material 6 is fixed.

Thereafter, the composite material 1 is disposed at a die (not shown), and as shown in FIG. 5C, the laminates separated into a plurality of layers are sequentially bent and formed layer by layer while pulling an end portion of the release material 6 on the side opposite to the to-be-bent portion 3 side.

After the forming is completed, the pressurization by the pair of clamping members 11 is released and the release material 6 is pulled out from the composite material 1. In this way, it is possible to obtain the composite material 1 on which the bending forming has been performed, similar to that of FIG. 1E. In a case where the release material 6 is cured together with the composite material 1 to obtain a final product, the curing step is performed without pulling out the release material 6 from the composite material 1.

In FIGS. 5A to 5C, the end portion of the release material 6 is fixed by the pair of clamping members 11 and the forming is then performed. However, the forming may be performed without performing the fixing by the pair of clamping members 11. One of the pair of clamping members 11 may be a forming tool.

Figure 6A:
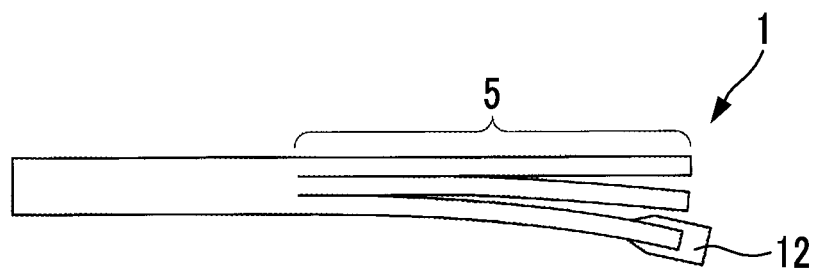
FIG. 6A is a diagram showing a state where a clip is mounted to the composite material from which the release material has been pulled out.
Figure 6B:
FIG. 6B is a diagram showing a state where the composite material of FIG. 6A is bent.
Figure 6B:
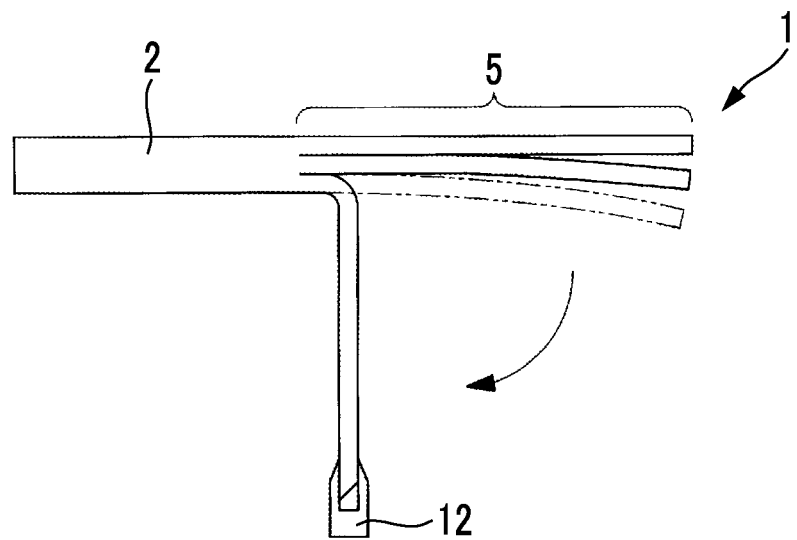

Next, a case where the pulling-out step is performed to pull out the release material 6 from the composite material 1 and the forming step is then performed will be described below with reference to FIGS. 6A and 6B. FIGS. 6A and 6B are schematic diagrams for explaining an example in a case where the composite material is bent using a bending tool. FIG. 6A is a diagram showing a state where a clip is mounted to the composite material from which the release material has been pulled out, and FIG. 6B is a diagram showing a state where the composite material of FIG. 6A is bent.

First, as shown in FIG. 6A, a clip 12 as the bending tool is mounted to clip an end portion (an end portion on the first region 5 side) of the laminate 2 on the next bending direction side, among the laminates 2 separated into a plurality of layers in the composite material 1 in a state where the release material 6 is pulled out.

Next, the composite material 1 is disposed at a die (not shown), and as shown in FIG. 6B, the laminate 2 is bent and formed while the end portion (the end portion on the first region 5 side) of the laminate 2 is pulled with the clip 12. After the bending forming of the first layer is completed, the clip 12 is removed from the laminate 2 in which the forming has been completed. Thereafter, the clip 12 is mounted to clip an end portion of the laminate 2 on the next bending direction side, and the same bending forming is performed. In this way, it is possible to obtain the composite material 1 on which the bending forming has been performed, similar to that of FIG. 1E. Thereafter, the curing step is performed, whereby the cured composite material 10 shown in FIG. 2 is obtained. The forming aspect in a case where the forming step is performed after the pulling-out step of pulling out the release material 6 is performed is not limited to the aspect using the clip 12 described above and is also not limited to the aspect in which the end portion of the laminate 2 is clamped and the bending forming is then performed.

According to this embodiment, with the configurations described above, the following operation and effects are exhibited.

In the composite material 1 of this embodiment, in the region 5 that is bent at the time of the forming (the region 5 from the end edge 4 on the bending side to the to-be-bent portion 3), the laminate 2 is separated into a plurality of layers along the plate thickness direction of the laminate 2. Therefore, the composite material 1 can be formed by sequentially bending the composite material 1 separated into a plurality of layers layer by layer. In this way, it is possible to prevent the occurrence of a problem such as the occurrence of wrinkles or the inability to obtain a desired shape, which has occurred when a thick laminate is bent and formed at one time. Further, it is also possible to prevent the occurrence of a problem such as an increase in the number of steps or labor for alignment, which has occurred when a plurality of thin laminates are prepared and sequentially formed. Further, it is also possible to prevent the occurrence of a problem in which the pulling-out of the sheet becomes difficult (the forming of the composite material becomes difficult) due to an increase in a frictional force that is generated between the sheet and the laminate, which has occurred when each sheet is sandwiched between a plurality of layers of the laminate and bending forming is performed while pulling out the sheets at one time.

The laminate 2 is integrated along the plate thickness direction of the laminate 2 in the region (second region) 8 on the side where it is not bent at the time of the forming, so that the laminate 2 in the second region 8 can be sufficiently fixed without being separated. Since the second region 8 is fixed, it is possible to further save labor for alignment of the composite material 1 at the time of forming the composite material 1.

In this embodiment, since the laminate 2 can be separated into a plurality of layers only by providing the release material 6 such as a non-woven fabric, a metal, or a release film between the respective layers of the laminate 2 separated into a plurality of layers, the composite material 1 can be easily prepared. Further, the composite material 1 can also be bent and formed by using the release material 6 as a bending tool, or the composite material 1 can also be bent and formed by separately using a bending tool that clamps the end portion of the laminate 2, such as the clip 12, after pulling-out of the release material 6. Further, by using, as the release material 6, a release material made of a material (various non-woven fabrics or thermoplastic film adhesives) that can be cured together with the composite material 1, it is possible to obtain a final product by curing the release material 6 together with the composite material 1. In this way, the operation of pulling out the release material 6 from the composite material 1 becomes unnecessary, and thus a man-hour can be reduced.

In the method of forming the composite material 1 of this embodiment, in the preparation step, as the composite material 1, the composite material 1 is prepared in which the laminate 2 is separated into a plurality of layers along the plate thickness direction of the laminate 2 in the region 5 that is bent at the time of the forming. Therefore, in the forming step, the composite material 1 can be formed by sequentially bending the composite material 1 separated into a plurality of layers layer by layer. In this way, it is possible to prevent the occurrence of a problem such as the occurrence of wrinkles or the inability to obtain a desired shape, which has occurred when a thick laminate is bent and formed at one time. Further, it is also possible to prevent the occurrence of a problem such as an increase in the number of steps or labor for alignment, which has occurred when a plurality of thin laminates are prepared and sequentially formed. Further, it is also possible to prevent the occurrence of a problem in which the pulling-out of the sheet becomes difficult due to an increase in a frictional force that is generated between the sheet and the laminate, which has occurred when each sheet is sandwiched between a plurality of layers of the laminate and bending forming is performed while pulling out the sheets at one time.

In the preparation step, the composite material 1 in which the laminate 2 is integrated along the plate thickness direction of the laminate 2 in the region (second region) 8 on the side where it is not bent at the time of the forming is prepared, so that the laminate 2 in the second region 8 can be sufficiently fixed without being separated. Since the second region 8 is fixed, it is possible to further save labor for alignment of the composite material 1 at the time of the forming step.

In this embodiment, since the laminate 2 can be separated into a plurality of layers only by providing the release material 6 such as a non-woven fabric, a metal, or a release film between the respective layers of the laminate 2 separated into a plurality of layers, the composite material 1 can be easily prepared in the preparation step.

The composite material 1 is bent through the release material 6, so that the composite material 1 can be bent and formed by using the release material 6 as a bending tool in the forming step. In this way, it is not necessary to separately prepare a bending tool that clamps the end portion of the laminate 2, such as the clip 12, in the forming step.

By using, as the release material 6, a release material made of a material (various non-woven fabrics or thermoplastic film adhesives) that can be cured together with the composite material 1, it is possible to obtain a final product by curing the release material 6 together with the composite material 1. In this way, the operation of pulling out the release material 6 from the composite material 1 becomes unnecessary, and thus a man-hour can be reduced.

As described above, after the pulling-out step of pulling out the release material 6 is performed, in the forming step, the composite material 1 can be bent and formed by separately using a bending tool that clamps the end portion of the laminate 2, such as the clip 12. The pulling-out step of pulling out the release material 6 is performed, so that at the time of the bending forming in the forming step, it is possible to prevent the release material 6 from interfering with the bending forming.

REFERENCE SIGNS LIST

1: composite material
2: laminate
3: to-be-bent portion
4: end edge
5: region (first region)
6: release material
7: end edge
8: region (second region)
10: cured composite material
11: (a pair of) clamping members
12: clip

The invention claimed is:

1. A method of forming a composite material, the method comprising:
a preparation step of preparing the composite material, which includes a laminate in which plural fiber sheets are laminated, the laminate having a bendable portion that is to be bent along a die, and in a first region of the laminate from an end edge on a bending side to the bendable portion, the laminate is separated into plural layers along a plate thickness direction of the laminate; and
a forming step of forming the composite material by bending the composite material separated into the plural layers, layer-by-layer, along the bendable portion,
wherein, in the preparation step:
the plural layers of the laminate are bonded and integrated along the plate thickness direction of the laminate in a second region on a side opposite to the end edge on the bending side with respect to the bendable portion; and
a release material is provided between at least two of the plural layers in the first region of the laminate.

2. The method according to claim 1, wherein, in the forming step, the composite material is bent through the release material.

3. The method according to claim 2, further comprising, after the forming step, a curing step of curing the composite material and the release material.

4. The method according to claim 1, further comprising:
a pulling-out step of pulling out the release material from the composite material, after the preparation step,
wherein, in the forming step, the composite material is bent using a bending tool.

5. The method according to claim 1, wherein the release material is not provided in the second region of the laminate.

6. The method according to claim 1, wherein the release material is a non-woven fabric.

7. The method according to claim 1, wherein the release material is a metal.

8. The method according to claim 1, wherein the release material is a film.

* * * * *